United States Patent
Kopec et al.

(10) Patent No.: US 8,216,332 B2
(45) Date of Patent: Jul. 10, 2012

(54) FILTER WITH A FILTER HOUSING

(75) Inventors: Edvard Kopec, Passau (DE); Klaus-Dieter Ruhland, Meckenheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 797 days.

(21) Appl. No.: 11/993,460

(22) PCT Filed: Jun. 20, 2006

(86) PCT No.: PCT/EP2006/063331
§ 371 (c)(1),
(2), (4) Date: Dec. 21, 2007

(87) PCT Pub. No.: WO2007/000397
PCT Pub. Date: Jan. 4, 2007

(65) Prior Publication Data
US 2010/0154368 A1    Jun. 24, 2010

(30) Foreign Application Priority Data
Jun. 25, 2005  (DE) .......................... 20 2005 009 989

(51) Int. Cl.
*B01D 46/00* (2006.01)
(52) U.S. Cl. ............... 55/480; 55/481; 55/493; 55/498; 55/506
(58) Field of Classification Search ............... 55/490, 55/492, 493, 495, 502, 480, 497, 498, 499, 55/501, 503, 506, 507, 508, 509, 510, 385.3; 210/238, 447, 470; 123/198 E
See application file for complete search history.

(56) References Cited

U.S. PATENT DOCUMENTS

| | | | |
|---|---|---|---|
| 2,409,078 A * | 10/1946 | Swann | 55/480 |
| 4,323,376 A * | 4/1982 | Rosenquest | 55/304 |
| 4,521,234 A * | 6/1985 | Peebles et al. | 55/481 |
| 4,671,943 A * | 6/1987 | Wahlquist | 422/300 |
| 4,775,469 A | 10/1988 | Zimmerly | |
| 4,925,469 A * | 5/1990 | Clement et al. | 55/480 |
| 4,963,170 A * | 10/1990 | Weber et al. | 55/311 |
| 5,030,264 A | 7/1991 | Klotz et al. | |
| 5,042,999 A * | 8/1991 | Ernst et al. | 55/482 |
| 5,569,311 A * | 10/1996 | Oda et al. | 55/493 |
| 5,725,624 A * | 3/1998 | Ernst et al. | 55/502 |
| 6,006,401 A * | 12/1999 | Jailor et al. | 15/361 |
| 6,231,630 B1 * | 5/2001 | Ernst et al. | 55/385.3 |
| 6,306,192 B1 * | 10/2001 | Greif et al. | 55/498 |
| 6,368,374 B1 * | 4/2002 | Tokar et al. | 55/498 |
| 7,004,986 B2 * | 2/2006 | Kopec et al. | 55/337 |
| 7,674,308 B2 * | 3/2010 | Krisko et al. | 55/502 |
| 2004/0040271 A1 | 3/2004 | Kopec et al. | |
| 2004/0206238 A1 * | 10/2004 | Allgeier | 95/273 |
| 2005/0193695 A1 * | 9/2005 | Holmes et al. | 55/482 |
| 2008/0010142 A1 * | 1/2008 | O'Brien et al. | 705/14 |
| 2008/0053049 A1 * | 3/2008 | Pfannenberg | 55/493 |
| 2008/0115758 A1 * | 5/2008 | Engelland et al. | 123/198 E |
| 2008/0250763 A1 * | 10/2008 | Widerski et al. | 55/357 |
| 2010/0139639 A1 * | 6/2010 | Igaki et al. | 126/204 |

* cited by examiner

*Primary Examiner* — Duane Smith
*Assistant Examiner* — Thomas McKenzie

(57) ABSTRACT

A filter device has a filter housing having a receiving space and a carrier housing. A filter element is arranged in the carrier housing, wherein the carrier housing is inserted into the receiving space of the filter housing and locked in the receiving space. A bracket with a clamping section is arranged on the carrier housing and is secured pivotally on the carrier housing by a hinge so as be pivotable between a locking position and a release position. In the locking position, the damping section of the bracket is clamped between a step on the filter housing and a step on the carrier housing and is secured in a self-locking position.

10 Claims, 5 Drawing Sheets

FILTER WITH A FILTER HOUSING

BACKGROUND OF THE INVENTION

The invention relates to a filter with a filter housing comprising a filter element received in a carrier housing, wherein the carrier housing is insertable into a receiving space in the filter housing and is lockable in the receiving space, and comprising a bracket arranged on the carrier housing.

In the publication EP 1 364 695 A1 an air filter is disclosed that, for filtering combustion air, is arranged in the intake section of an internal combustion engine. The air filter comprises a filter cartridge that is inserted radially into a filter housing and through which the combustion air to be filtered flows axially. The filter cartridge comprises a carrier housing in which the filter element is received. For inserting and removing the filter cartridge, a pivotable bracket is arranged on the carrier housing and is intended to facilitate manipulation during mounting and exchange of the filter cartridge.

When inserting the filter cartridge, care must be taken that the filter cartridge is seated safely in the filter housing. For this purpose, usually locking means are provided by means of which the inserted filter cartridge is fixedly secured in the filter housing. For example, the locking action of the filter cartridge is realized by means of a housing lid that, after insertion of the filter cartridge, is placed onto the filter housing. In other embodiments, clamping devices can be provided on the filter housing by means of which the filter cartridge is clamped after insertion.

The invention has the object to provide a constructively simple filter whose filter element can be locked with minimal expenditure in the filter housing.

SUMMARY OF THE INVENTION

This problem is solved according to the invention in that the bracket is secured pivotally on the carrier housing by means of a hinge and is pivotable between a locking position and a release position, wherein in the locking position a clamping section of the bracket is clamped between a step on the filter housing and a step on the carrier housing and secured in a self-locking position. The dependant claims provide expedient embodiments.

The bracket is pivotally secured by means of a hinge on the carrier housing and can be moved between a locking position and a release position. In the locking position, a clamping section on the bracket is clamped between a step of the filter housing and a step of the carrier housing so that, on the one hand, the bracket is in a self-locking position when in the locking position and, on the other hand, the carrier housing is clamped in the filter housing. The filter element is received in the carrier housing, and the carrier housing and the filter element together form a filter cartridge. By locking the carrier housing on the filter housing, the filter element is locked also automatically.

For releasing the filter cartridge, the bracket must only be pivoted into its release position so that the clamping section on the bracket leaves its self-locking position and, overall, the locking position is cancelled. After reaching the release position, the filter cartridge can be removed from the receiving space in the filter housing by means of the bracket.

This embodiment has several advantages. On the one hand, no additional component for clamping the filter cartridge in the filter housing is required. Instead, the pivotally arranged bracket on the carrier housing can be used in a double function according to which the bracket, on the one hand, has a support function for inserting into and removing from the filter housing and, on the other hand, has a clamping function in the locking position. For moving the bracket between the locking position and the release position, a simple pivot movement of the bracket is performed.

A further advantage is to be seen in that the bracket in the locking position has a self-locking position that is achieved by clamping between the step on the carrier housing and the step on the filter housing. This self-locking action of the bracket provides an additional safety measure against accidental, unintended release from the locking position.

The pivot movement is performed by means of activation of the bracket wherein this movement, as a result of the spacing between the top side of the bracket and the pivot axis of the hinge on the bracket is performed with a relatively large torque so that reaching the clamping or locking position as well as releasing the locking position are facilitated.

In an expedient embodiment, the clamping section on the bracket is in the form of a bracket shoe that is a component of the hinge by means of which the bracket is pivotally secured on the carrier housing. This bracket shoe is of an approximately rectangular configuration in an advantageous embodiment wherein the narrow side of the rectangle in the locking position is supported on the steps on the filter housing and on the carrier housing. In the release position, however, the narrow sides do not engage the steps so that the bracket is freely pivotable or at least pivotable with only minimal force expenditure. The narrow sides represent at the same time a flat support surface on the bracket shoe by means of which a flat support action on the steps at the carrier housing and filter housing can be realized.

The longitudinal axis extending from narrow side to narrow side of the rectangular bracket shoe is expediently positioned relative to the axis of the bracket at an angle that is smaller than 90 degrees, in particular, approximately 70 degrees. As a result of this angled arrangement between bracket shoe and bracket, the bracket in the locking position rests at a slant against the outer wall of the carrier housing so that the top section of the bracket is prevented from projecting past the top side of the carrier housing and a space-saving arrangement is achieved in the locking position. In the release position, however, the bracket is pivoted into an upright position in which the upper section of the bracket projects past the top side of the carrier housing so that this part of the bracket can be easily gripped. In the upright position of the bracket, the bracket shoe is in the release position.

According to a further advantageous embodiment, the step on the carrier housing on which the clamping section is supported in the locking position is configured as a projecting annular shoulder; in particular, it can be reinforced by one or several reinforcement ribs in order to ensure that the supporting force introduced at certain points by the clamping section in the locking position does not cause bending of the step on the carrier housing usually made of relatively soft plastic material.

According to another advantageous embodiment, the hinge has a hinge receptacle into which a pivot pin projects. It can be expedient in this connection that the pivot pin is received with play in the hinge receptacle in order to enable outside of the locking position an easy friction-free pivoting of the bracket. In the locking position, however, the self-locking action of the bracket is achieved in that the clamping section is supported on steps of the carrier housing and of the filter housing provided for this purpose. A support on the pivot pin is however not required which has the advantage that the pivot pin must not receive supporting forces and, accordingly, no high stability requirements are placed on the pivot pin. It is therefore sufficient to mold, for example, a slightly pronounced pivot pin on the carrier housing that projects into the matching hinge receptacle on the bracket.

BRIEF DESCRIPTION OF THE DRAWINGS

Further advantages and expedient embodiments can be taken from the further claims, the description and the drawings. It is shown in:

DESCRIPTION OF PREFERRED EMBODIMENTS

Figure 1:
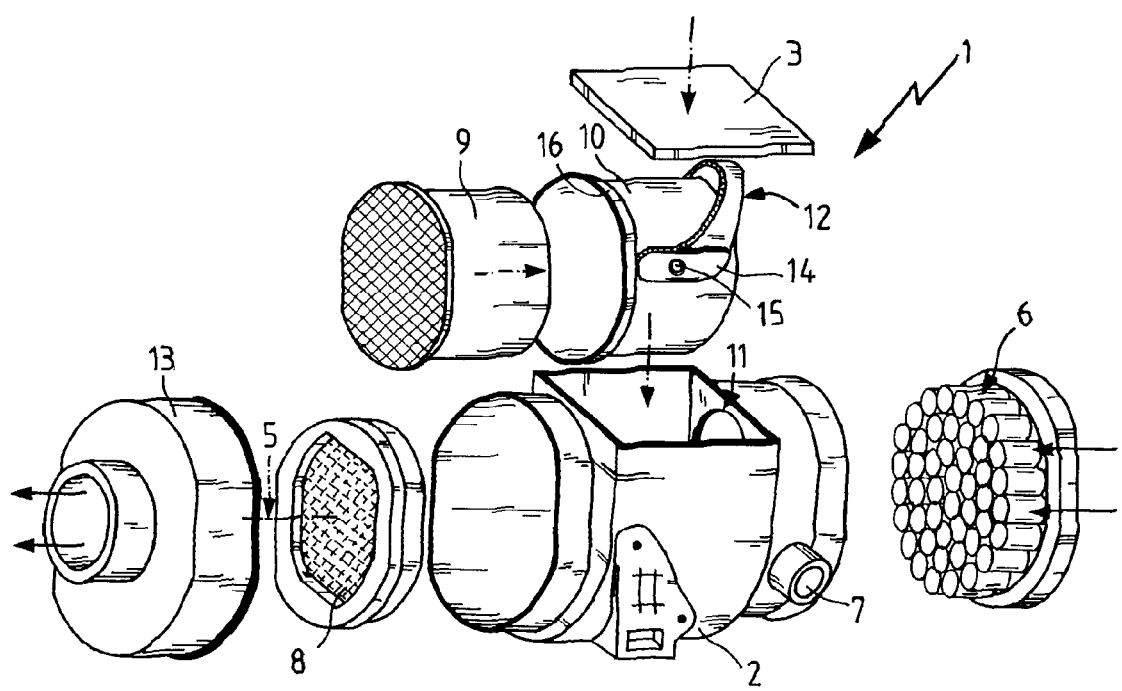
FIG. 1 a perspective view of a filter through which the fluid to be filtered flows axially and that is provided with a filter element radially insertable into a filter housing that is received in a carrier housing on which a bracket is pivotally mounted wherein the bracket is pivotable into a position in which the carrier housing is locked in the filter housing.

In the Figures, same components are referenced with same reference numerals.

FIG. 1 illustrates an air filter 1 that is arranged in the intake section of an internal combustion engine in order to filter the supplied combustion air before it is being fed into the air intakes of the motor. The filter 1 comprises a filter housing 2 with a receiving space 11 that is open in the upward direction into which a filter cartridge is insertable from above in the radial direction. The filter cartridge comprises a filter element 9 in a carrier housing 10. For facilitating handling as well as for locking the filter cartridge in the inserted state, on the carrier housing 10 a bracket 12 is pivotably supported.

After insertion of the filter cartridge, the receiving space 11 is closed by a housing lid 3 that can be fixedly locked by suitable locking elements on the filter housing 2 The filter cartridge with filter element 9 and carrier housing 10 has an approximately oval cross-section in the illustrated embodiment.

The filter element 9 is the central filter element of the filter 1. Moreover, a pre-filter is arranged upstream which is configured as a cyclone separator 6 to which the air to be filtered is supplied in the direction shown by the arrow. The air to be filtered passes through the entire filter 1 in the direction of the longitudinal axis 5. In the cyclone separator 6 the dirt particles contained in the unfiltered air are carried outwardly as a result of centrifugal force in the cyclone separator and are removed through the radially outwardly extending opening 7 from the pre-separator housing.

Moreover, a fine filter 8 is arranged on the outlet side of the filter is provided axially downstream of the central filter element 9. This fine filter 8 is to be closed by an outer cover 13 that is placed axially onto the end face of the filter.

The pre-filter (cyclone separator 6) as well as the downstream filter (fine filter 8) have expediently their own housing which is configured separate from the filter housing 2 and is to be connected to the filter housing 2 in the mounting position.

On the bracket 12 a bracket shoe 15 is formed that functions as a clamping section and is a monolithic part of the bracket. This bracket shoe is approximately rectangular. Also, in the bracket shoe 14 a hinge 15 is provided that is comprised of a pivot pin molded on the carrier housing 10 and projecting radially past the wall surface of the carrier housing 10 as well as a receptacle in the bracket shoe into which the pivot pin projects. The bracket 12 is to be pivoted about the pin between a locking position and a release position wherein in the release position the filter cartridge can be inserted into the receiving space 11 and can be removed from it while in the locking position the inserted filter cartridge is locked fixedly in the filter housing 2 and the bracket 12 moreover is in a self-locking position. In the locking position of the bracket 12 the oppositely positioned narrow sides of the bracket shoe 14 are supported on steps on the carrier housing 12 as well as on the filter housing 2. The step on the carrier housing 10 is an annular shoulder 16 extending circumferentially on an end face of the carrier housing.

Figure 2:
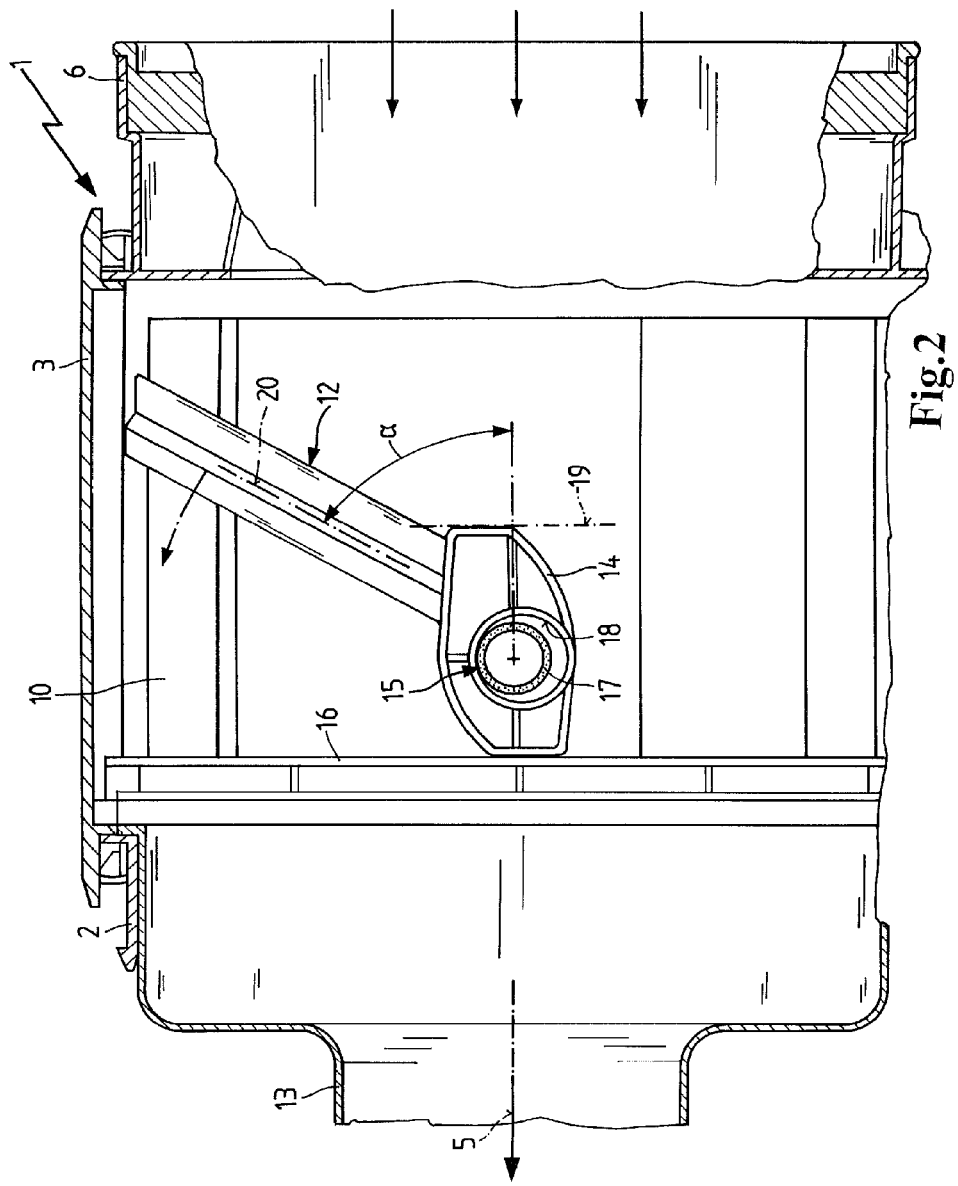
FIG. 2 a side view of the filter cartridge comprising the carrier housing and the filter element and inserted into the receiving space in the filter housing, wherein the bracket on the carrier housing is positioned in its locking position.

As shown in FIG. 2, the hinge 15 comprises the hinge receptacle 18 in the bracket shoe 14 which has a greater diameter than the pin 17 that is formed integrally with the carrier housing 10. In this way, the bracket 12 can be moved with play which enables a friction-free pivoting of the bracket. The pivot pin 17 is eccentrically positioned in the hinge receptacle 18.

FIG. 2 shows the bracket shoe 14 in the locking position in which the forward narrow side of the approximately rectangular bracket shoe rests against the annular shoulder 16 and the rearward narrow side of the bracket shoe rests against the schematically illustrated step 19 on the filter housing 2. In the locking position the bracket shoe 14 is fixedly clamped between the step 19 and the annular shoulder 16. The annular shoulder 16 has reinforcement ribs in order to prevent deformation by the clamping force introduced through the bracket shoe 14 at certain points.

By means of this configuration, in the locking position the bracket shoe 14, on the one hand, is supported on the step on the carrier housing 10 and, on the other hand, on the step of the filter housing 2. The bracket shoe therefore is clamped automatically so that the self-locking action is achieved. Moreover, the entire filter cartridge with filter housing 10 and filter element received within the receiving space of the filter housing 2 is moved forwardly in the axial direction toward the front cover 13 and in this displaced position is secured in the receiving space in that a component of the filter cartridge, in particular the circumferentially extending annular shoulder 16 of the carrier housing 16, is supported on the filter housing 2. As a result of the support action on the annular shoulder 16 and the step 19 on the filter housing 2, the hinge 15 is relieved of locking and clamping forces. The pivot pin 17 must not take up any clamping forces.

As shown also in FIG. 2, an angle a that is smaller than 90 degrees and, in particular, is approximately 70 degrees, is defined between the longitudinal axis through the bracket shoe 14, which axis extends through the narrow sides of the approximately rectangular bracket shoe and coincides with the longitudinal axis 5 of the filter in the position of the bracket shoe illustrated in FIG. 2, and the longitudinal axis 20 of the bracket through the lateral bracket sections. The lateral bracket sections of the bracket 12 open at the longitudinal sides of the bracket shoe 14. The bracket shoe 14 is an integral part of the bracket 12. The bracket 12 engages the outer side of the carrier housing 10 and extends approximately in a semi-circle about the circumference of the carrier housing wherein, in total, two bracket shoes are provided on opposite sides of the carrier housing that are identical and are pivotally secured on the carrier housing 10.

Figure 3:
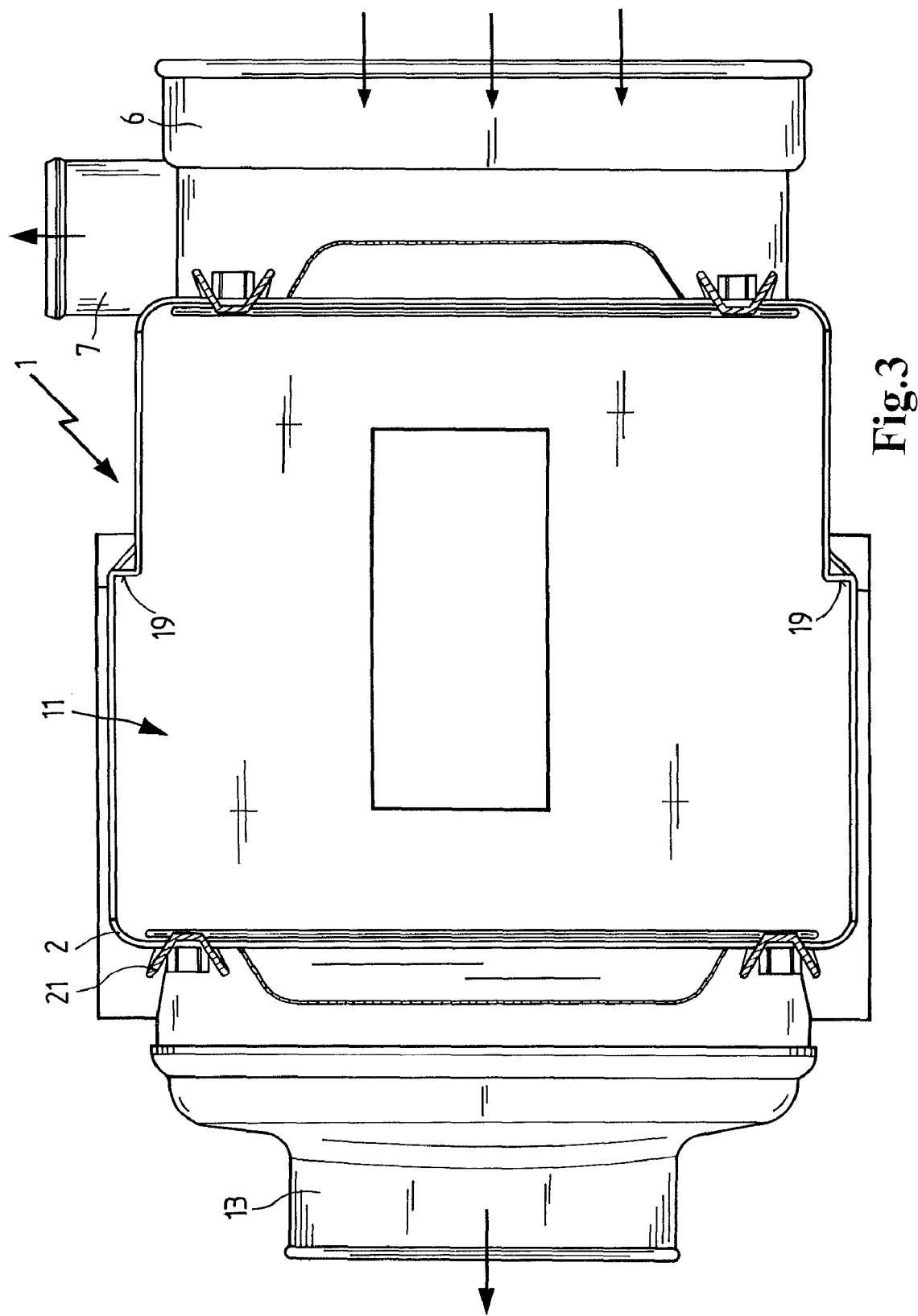
FIG. 3 a plan view onto the receiving space in the filter housing, illustrated without filter cartridge.

In FIG. 3 the receiving space 11 in the filter housing 2 is shown in a plan view without the filter cartridge. Illustrated also are the steps 19 in the two lateral areas of the receiving space 11 in the filter housing 2 on which in the locking position the bracket shoes of the inserted filter cartridge are supported. Moreover, in FIG. 3 the clamping devices 21 are shown in the upper part of the filter housing 2 by means of which the lid placed onto the open side of the receiving space 11 is fixedly connected to the filter housing 2.

Figure 4:
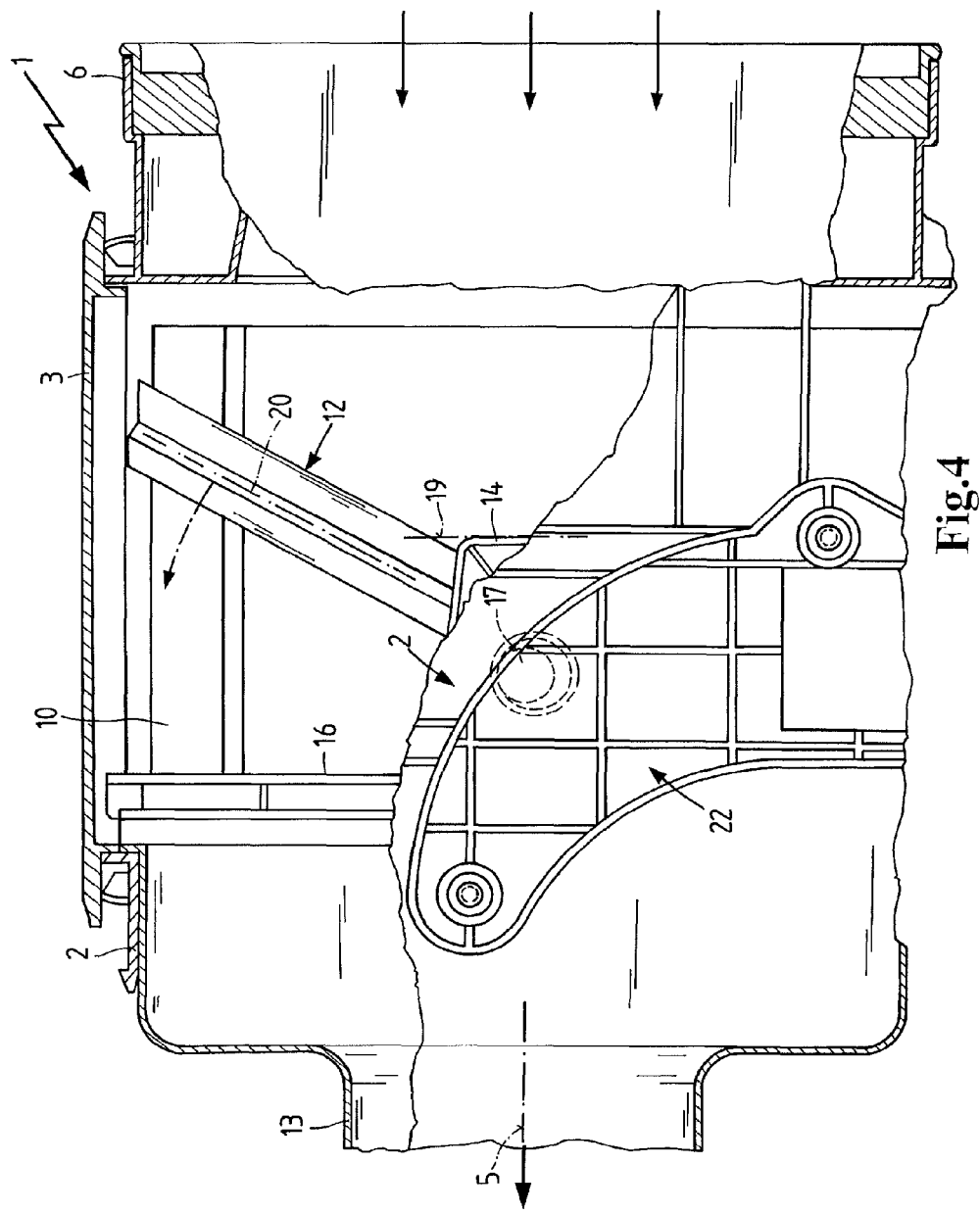
FIG. 4 an illustration corresponding to FIG. 2 but with partially illustrated wall of he outer filter housing into which the filter cartridge is inserted.

The illustration according to FIG. 4 correspond substantially to that of FIG. 2 wherein in FIG. 4, in addition, a wall of the filter housing 2 delimiting the receiving space is illustrated partially. At the exterior of this wall a fastening flange 22 is arranged by means of which filter 1 can be mounted in the intake cycle of the internal combustion engine.

Figure 5:
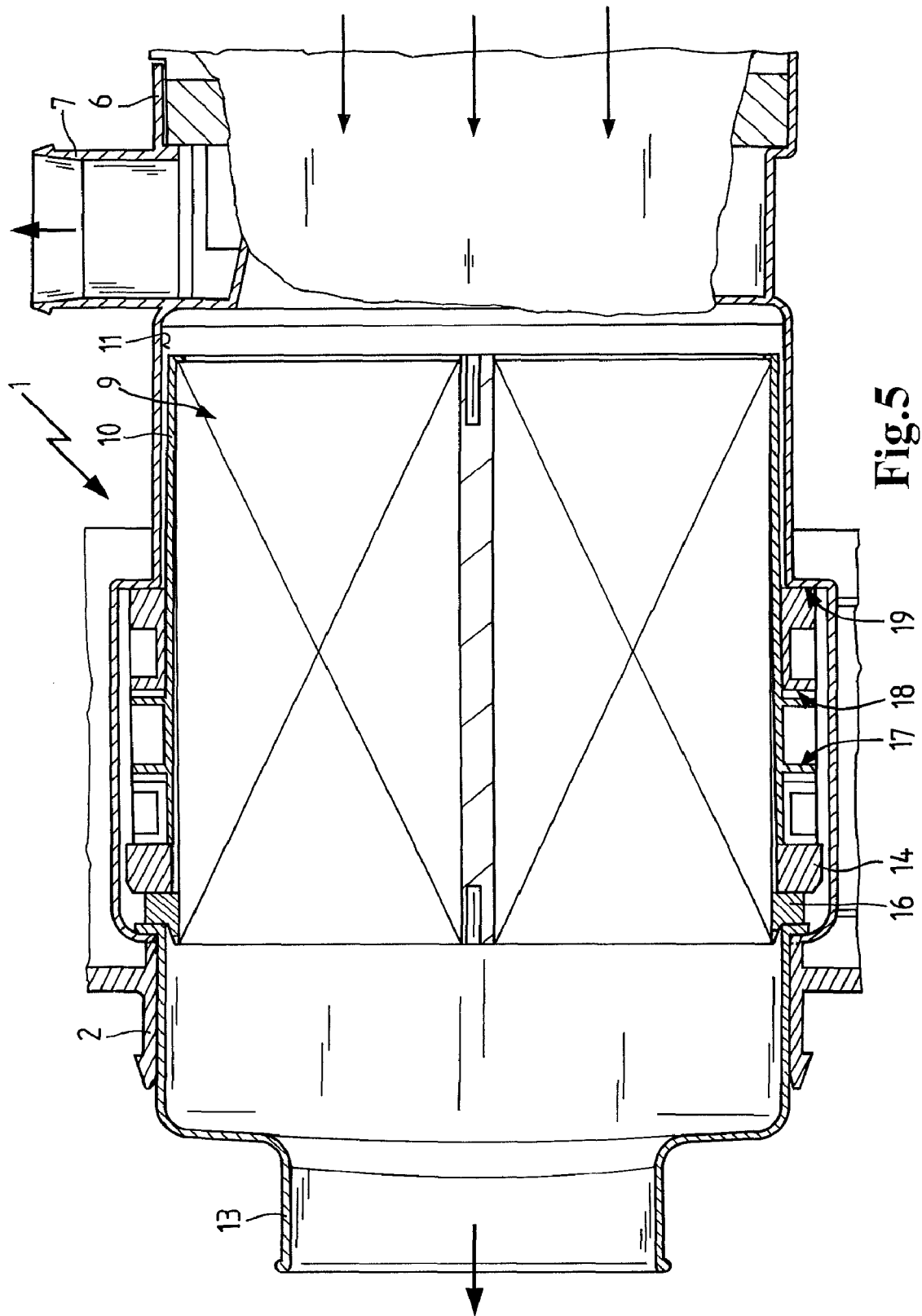
FIG. 5 a further view from above onto the filter with inserted filter cartridge illustrated in section.

In FIG. 5, the filter cartridge with filter element 9 and carrier housing 10 is shown in section in the position with the filter cartridge inserted into the receiving space 11 in the filter housing 2. The locking position is illustrated in which the forward narrow side of the bracket shoe 14 rests against the annular shoulder 16 on the carrier housing 10 and the rearward narrow side of the bracket shoe rests against the step 19 on the filter housing 2. In the locking position the entire filter cartridge is moved forward within the receiving space 11 so that in the rearward part of the receiving space 11 a gap remains. In the forwardly moved locking position an axial movement of the filter cartridge within the receiving space 11 is prevented.

FIG. 5 also shows the pivot pin 17 that is integrally molded on the exterior wall of the carrier housing 10. The pivot pin 17 is positioned with play in the hinge receptacle 18 formed in the bracket shoe 14.

What is claimed is:

1. A filter comprising:
   a filter housing having a receiving space and a housing lid;
   said housing lid covering an opening of said receiving space;
   a carrier housing;
   a filter element arranged in the carrier housing,
   wherein said carrier housing has a sidewall which encircles and closes circumferentially around a radial sidewall of said filter element,
   wherein the carrier housing is inserted into the receiving space of the filter housing and locked in the receiving space;
   a filter cartridge clamping bracket extending approximately in a semi-circle circumferentially around sidewalls of said carrier housing, said clamping bracket including a clamping section configured as a bracket shoe,
   wherein the clamping bracket is secured pivotally proximate to opposing ends of said semi-circular clamping bracket onto the carrier housing by a hinge so as to be pivotable between a locking position and a release position;
   wherein in the locking position, the clamping section of the bracket is clamped between and supported by engagement each with a step on the filter housing and a step on the carrier housing so as to secure said filter housing on said carrier housing,
   wherein in said locking position said clamping bracket exerts clamping forces between a step on the filter housing and a step on the carrier housing, said clamping forces locking an axial position of said carrier housing and said filter element within said filter housing,
   wherein said carrier housing and said clamping bracket are received into and completely enclosed within said receiving space by said filter housing and said housing lid,
   wherein said bracket shoe is rectangular and includes a hinge receptacle extending through said bracket shoe, said hinge receptacle forming part of said hinge pivotally securing said clamping bracket onto said carrier housing,
   wherein said bracket shoe includes two oppositely positioned narrow sides, and two oppositely positioned longer sides,
   wherein when in said locking position, a first one of said oppositely positioned narrow sides engages against and is supported on said step on said filter housing and an opposing second one of said narrow sides engages against and is supported on said step on said carrier housing, said bracket shoe engaging against both steps while in said locking position.

2. The filter according to claim 1, wherein
   arranged between said opposing ends of said bracket is a top side portion of said bracket, said top side portion operable to pivotally actuate said clamping bracket between said release position and said locking position.

3. The filter according to claim 2, wherein
   in the locking position, said bracket shoe has said rectangular portion arranged substantially parallel to said sidewall of said carrier housing onto which said bracket shoe is pivotally secured,
   wherein each end of said narrow side connects to a respective end of one of said longer sides of said bracket shoe,
   wherein said longer sides have proximate to one end a rounded contour portion curving inwardly on said bracket shoe to where it connects to said narrow side
   wherein a longitudinal axis of said bracket shoe extends through said oppositely positioned narrow sides,
   wherein said clamping forces are exerted through said bracket shoe from said first of said narrow sides to said second one of said narrow sides of said bracket shoe.

4. The filter according to claim 3, wherein
   said longitudinal axis of the bracket shoe is positioned relative to a longitudinal axis of the bracket at an angle smaller than 90 degrees.

5. The filter according to claim 4, wherein the angle is approximately 70 degrees.

6. The filter according to claim 1, wherein the step of the carrier housing is an annular shoulder,
   wherein said annular shoulder is arranged proximate to an axial end of said carrier housing and projects radially outwardly from said sidewall of said carrier housing.

7. The filter according to claim 6, wherein at least one reinforcement rib is arranged on the annular shoulder,
   wherein said annular shoulder comprises at least two annular shoulder members, said shoulder members arranged in an axially spaced parallel arrangement on said carrier housing sidewall and projecting radially outwardly from said carrier housing wall,
   wherein each of said at least one reinforcement rib is arranged between and secured at opposing reinforcing rib ends to separate ones of said annular shoulder members,
   wherein said at least one reinforcing rib reinforceably couples said annular shoulder members, reinforcing said annular shoulder.

8. The filter according to claim 1, wherein the hinge comprises said hinge receptacle and a pivot pin, wherein the pivot pin is arranged with play in the hinge receptacle.

9. The filter according to claim 1, wherein at least one of the filter housing, the carrier housing, and the bracket is an injection-molded plastic part.

10. The filter according to claim 8, wherein said play in said hinge receptacle assures said clamping forces are not exerted on said pivot pin.

* * * * *